US008639380B1

(12) United States Patent
Lund

(10) Patent No.: US 8,639,380 B1
(45) Date of Patent: Jan. 28, 2014

(54) AUTOMATED TRANSPORT CONTROL SYSTEM

(71) Applicant: Van Metre Lund, Evanston, IL (US)

(72) Inventor: Van Metre Lund, Evanston, IL (US)

(73) Assignee: Autran Corp., Evanston, IL (US)

( * ) Notice: Subject to any disclaimer, the term of this patent is extended or adjusted under 35 U.S.C. 154(b) by 0 days.

(21) Appl. No.: 13/815,520

(22) Filed: Mar. 8, 2013

Related U.S. Application Data

(62) Division of application No. 12/658,015, filed on Feb. 1, 2010, now Pat. No. 8,428,770.

(51) Int. Cl.
*G06F 7/00* (2006.01)
*G05B 11/01* (2006.01)
*G05B 19/04* (2006.01)
*B61J 3/00* (2006.01)

(52) U.S. Cl.
USPC ........... 700/213; 700/228; 700/255; 700/259; 700/19; 700/20; 104/88.01; 414/228

(58) Field of Classification Search
None
See application file for complete search history.

(56) References Cited

U.S. PATENT DOCUMENTS 6,237,500 B1 * 5/2001 Lund ..................... 104/88.01

* cited by examiner

*Primary Examiner* — Yolanda Jones

(57) ABSTRACT

Each load-carrier of a system is always controlled by one of a series of MCUs (monitoring and control units) that are assigned to contiguous regions along guideways. Each carrier is slowed down to maintain a safe distance behind a carrier ahead, or to avoid collision with another carrier when approaching a merge point of a convergent Y-junction or when otherwise desirable. Distance measurements take into account the lengths of carriers and of assigned regions and the counts of speed pulses sent to MCUs since entry of carriers into their respective regions. For merge control, arrival data are developed that include the times and speeds to and at arrival of two carriers at a merge point. Through repeated comparisons of arrival data developed from one carrier with arrival data previously developed and stored as to the other carrier, the one carrier is gradually slowed down as necessary to avoid a collision.

18 Claims, 9 Drawing Sheets

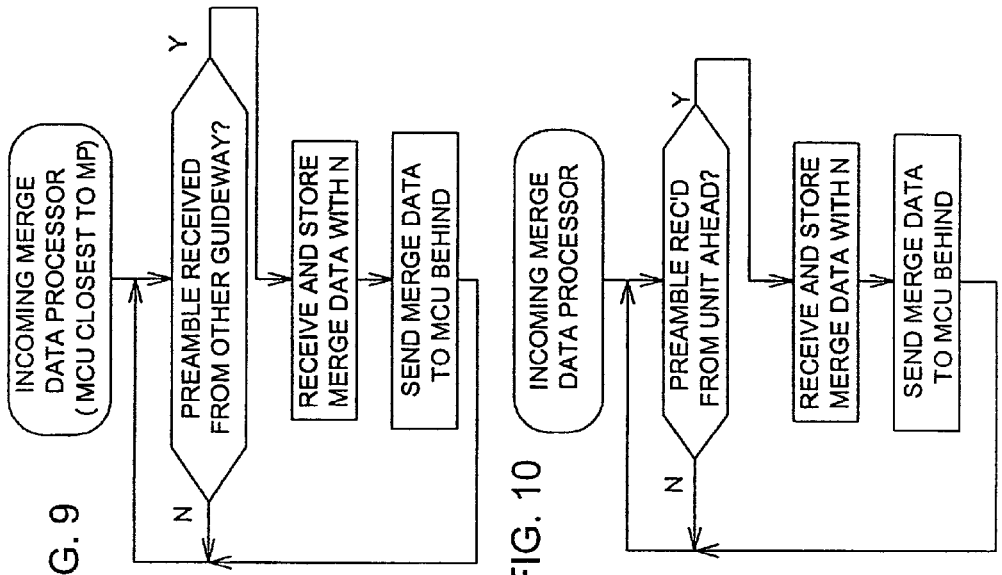
FIG. 9
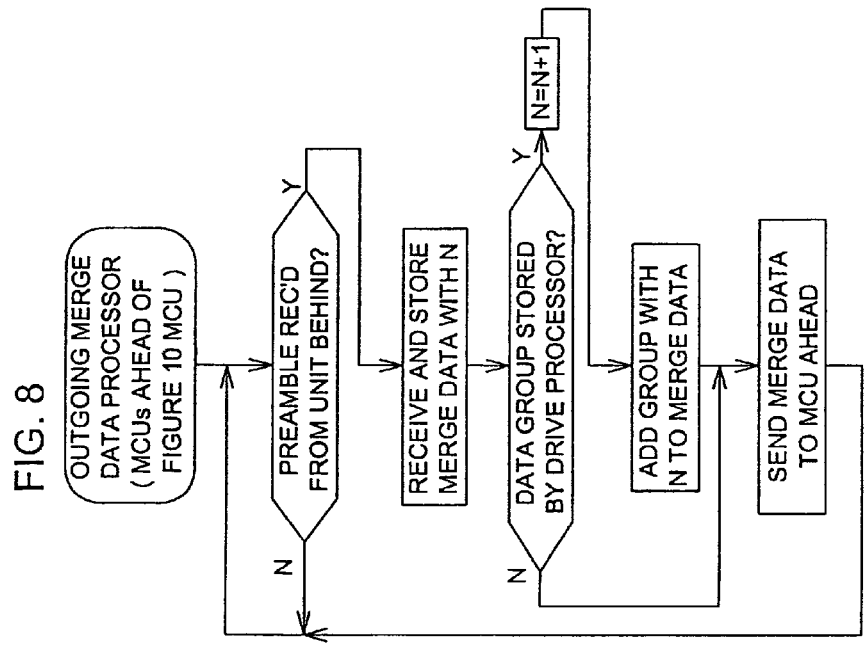
FIG. 10
FIG. 8

AUTOMATED TRANSPORT CONTROL SYSTEM

This application is a division of patent application U.S. Ser. No. 12/658,015, entitled "AUTOMATED TRANSPORT CONTROL SYSTEM", filed Feb. 1, 2010.

BACKGROUND OF THE INVENTION

This invention relates to improvements upon prior automated transport systems, particularly those disclosed in my U.S. Pat. Nos. 5,590,603, 5,590,604, 5,598,783, 5,706,735, 5,979,334, 6,082,268, 6,237,500, 6,622,635 and 8,272,331 and in references cited therein.

SUMMARY OF THE INVENTION

This invention is part of an evolutionary process that has occurred during many years of my work on the design of automated transport systems that might help solve a myriad of transportation problems. My issued patents disclose systems in which loads are moved on carriers (referred to as "carrier vehicles" in my patents) that operate on electrified guideways. They include disclosures of control systems that have a number of advantageous features. An object of this invention is to improve upon such control systems.

A more specific object is to provide a control system that will be usable in control of operations of carriers on a network of guideways. I envision the initial building of an automated system that will be on relatively small scale but that will be successful and profitable and that will be duplicated and expanded, leading to interconnections and the formation of a network on a wide scale.

The control system of this invention has an architecture which facilitates expansion and interconnection of guideways to form a wide-scale network for reliable automated movement of carriers from any point of the network to another. The architecture also provides a system that is flexible, resilient and robust, in which the likelihood of failures is minimized and it which the effects of any failures that might occur are localized to prevent breakdown of the system as a whole or of any substantial portion thereof.

The architecture of the system of the invention includes features that are disclosed in my issued patents but with many additions and improvements. Monitoring and control units (MCUs) operate in contiguous regions along guideways and are interconnected for transfer of control and transfer of data from one to another. The architecture is such that all data required for operation of the system is either stored in the memories of the MCUs or is acquired by the MCUs from passing carriers during operation. The architecture is also such that all essential control functions of the system are performed by processors of the carriers and the MCUs. A central computer may be provided for receiving data from MCUs, for tracking movements of carriers and loads, for billing purposes, for analysis of performance and for reporting problems. Using security safeguards, a central or other computer may exercise control of MCUs in the event of power failures or other problems. However, the system requires no central or any other computer that can malfunction and cause a breakdown of a complete system or any substantial portion of a complete system.

The architecture is also such that almost all required transfers of data are through direct connections that can be reliably effected at very high speeds. Wireless transfers of data are made between carriers and MCUs but they are made through protected inductive couplings and through very short distances. A high degree of protection is thereby provided against adverse effects of outside sources of radiation and against attempted sabotage.

In accordance with more specific features of the invention, each MCU obtains data from a carrier passing through its region. Such data include data that may preferably include X and Y coordinates and that identify a desired destination of the carrier, if empty, a desired destination of an auto, pallet or container being carried or a desired destination or desired destinations of a passenger or passengers being carried in a passenger cabin. MCUs in advance of each divergent Y junction in the system compare the desired destination data supplied by the carrier with data stored by the MCUs to steer the carrier through the Y junction.

Data obtained from a carrier also include identification data and data as to load-carrying capabilities, dimensions and other characteristics of the carrier and of any load being carried. Carrier/loads are allowed to have different lengths and may include a load in the form of a trailer. The system operates to insure a safe following distance between each carrier/load and a carrier/load ahead and to insure safe merging of carrier/loads, regardless of lengths thereof.

An important feature relates to transfer of control from one MCU to another as a carrier moves along a guideway. MCUs are connected to detectors which detect markers on carriers when moved into proximity thereto. The positions of the detectors define the boundaries of the contiguous regions of monitoring and control by the MCUs. When a detector of a MCU detects a marker, the MCU takes active monitoring and control of the passing carrier and also sends a signal to the preceding MCU behind to terminate its active monitoring and control of the carrier. Each carrier is always under active control by one and only one MCU.

Another important feature relates to the generation of position data which defines the distance of travel of a carrier after entering the assigned region of control of a MCU. Each carrier generates pulses which are sent to MCUs at a rate proportional to speed. Each pulse thereby represents a certain distance of travel of the carrier. When a MCU takes active monitoring and control of a carrier, a counter is started to register position data which are proportional to distance traveled. The position data so registered are used in obtaining accurate determinations of following distances and, during merge control, of the relative expected positions of carriers at a merge point.

For control of following distance, the processor means of each MCU that is in active control of a passing carrier sends position data to the next MCU behind. If not in active control of a passing carrier, as is usually the case, the next MCU behind adds distance data corresponding to the length of its assigned region and sends it to the next MCU behind. When the data reaches a MCU which is in active control it adds distance data corresponding to the length of its assigned region and subtracts the position data it develops from a passing carrier. Data are thereby developed which accurately reflect the following distance behind a carrier ahead.

Important features relate to the provision of MCUs in two parallel control means along guideways and in divergent or convergent Y junctions. The two control means are not necessarily located physically along left and right sides of a guideway or junction but may be so located and are referred to herein, and pictured, as constituting left and right control means. Both may monitor a passing carrier and send drive control signals to a carrier either of which may be used by the carrier, thereby providing a redundant control for safety and reliability. In Y junctions, only one is in active control depending upon whether a carrier is entering through or exiting from a left or right entrance or exit guideway. However, both may monitor a passing carrier in Y junctions and through cross-connections, both may obtain data as to the speed of and distance to a carrier ahead on either a right or left guideway to maintain a safe following distance behind the carrier ahead.

Important features of the invention relate to control of merging of movements of carriers from two guideways though a convergent Y-junction. Means are provided for comparison of data obtained from each carrier moving along one guideway with data obtained from carriers moving along the other of the two guideways to detect any potential for a collision in a merge region and to take appropriate remedial action to avoid any collision.

In accordance with these features, MCUs along each guideway that approach a merge point develop as to each passing carrier arrival data that includes information as to the expected speed of arrival at the merge point and as to the time to arrival at the merge point. The arrival data that is currently so developed will be sent to MCUs along the opposite guideway. However, before that happens, a comparison is made between the currently-developed arrival data and arrival data previously sent from the opposite guideway to determine where the passing carrier can be expected to be in relation to the merge point at the expected times of arrival of carriers moving along the opposite guideway. A MCU will take no action if the passing carrier is expected to be either safely behind or safely ahead of carriers on the opposite guideway. A MCU may start to apply decelerating data to the passing carrier that will eventually cause it to be safely behind a carrier on the opposite guideway before the carrier on the opposite guideway reaches the merge point. However, a MCU will not apply decelerating data to the passing carrier if a MCU along the opposite guideway can by applying decelerating data of less value cause a carrier on the opposite guideway to be safely behind the passing carrier before the passing carrier eventually reaches the merge point.

Important features relate to the provision of a number of different processor operating programs. It would be difficult if not practically impossible to provide one processor operating program that could be used in all MCUs However, different operating programs are disclosed that are suitable for particular circumstances and that demonstrate principles that may be applied to other circumstances.

One processor operating program of the invention is suitable for the case in which a MCU is along a guideway that is not in a merge zone or in an acceleration or deceleration zone. Another processor operating program of the invention is suitable for the case in which carriers are moving at about the same high speed in two guideways and are to merge into a third guideway. A third processor operating program of the invention is suitable for the frequent case in which carriers upon being loaded in a loading station are to undergo a scheduled acceleration and enter a main line guideway to merge with carriers moving at a high speed. Each of such programs allow for changes in operating parameters but each is suitable for situations that may commonly be encountered. Using principles applied to the above three cases, operating programs may be designed for other cases that may commonly be encountered or which may infrequently or rarely occur.

Another feature relates to use of separate processors to perform different functions, so as to limit the effect of failures. A drive processor is used to develop drive data for controlling drive of the carrier. Another processor is used for sending carrier ahead data back to a MCU behind, another for sending outgoing merge data to a MCU ahead and another for sending incoming merge data to a MCU behind. Each processor may be designed, constructed and tested to insure its performance of its limited function. A temporary failure of the drive processor of one MCU should have limited effect on the critical functions of the latter three processors and should have limited effect on the speed of a carrier. If a carrier is moving at 130 feet/second and the length of the assigned region of a MCU is 40 feet, a failure of the drive processor of one MCU may result in a lapse about 0.3 seconds in the sending of drive data to the carrier and in coasting of the carrier for 0.3 seconds. There may be a reduction in speed but it should be small and, if other processors are working properly, the processor of the next MCU ahead can be expected to restore control after 0.3 seconds.

A further feature relates to the rapid performance of operations to obtain quick responses to changes in conditions. In an illustrated embodiment, the drive processor is operated in response to pulses which may be supplied at a 100 Hz rate, for example, so as to respond in 0.01 seconds to a change in conditions.

The foregoing and other objects, features and advantages of the invention will become more fully apparent from the following detailed description taken in conjunction with the accompanying drawings.

BRIEF DESCRIPTION OF THE DRAWING FIGURES

FIG. 8 is a flow diagram showing the operation of another type of outgoing merge data processor for the MCU of FIG. 4;

FIG. 9 is a flow diagram showing the operation of one type of incoming merge data processor for the MCU of FIG. 4

FIG. 10 is a flow diagram showing the operation of another type of incoming merge data processor for the MCU of FIG. 4;

DESCRIPTION OF PREFERRED EMBODIMENTS

Figure 1:
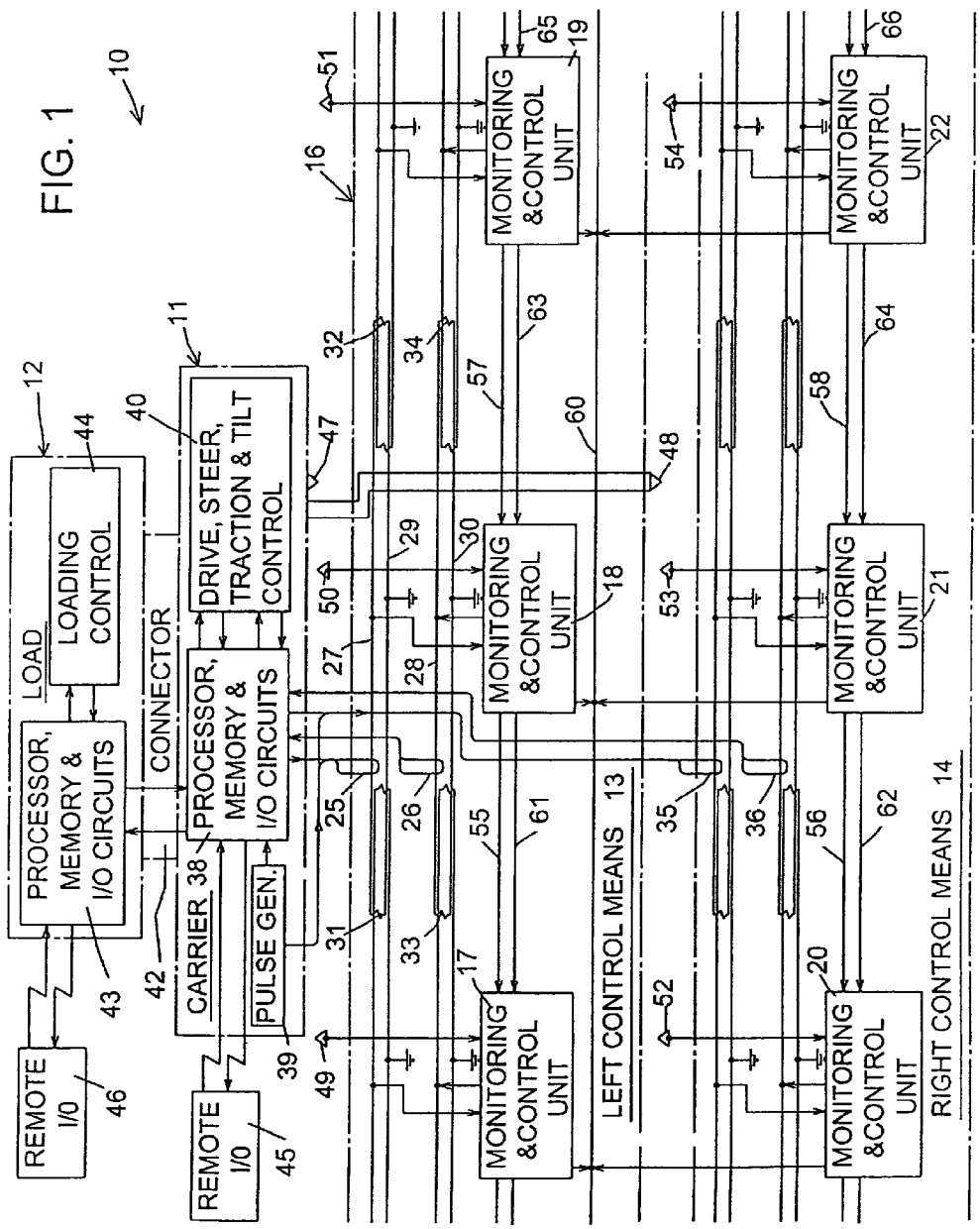
FIG. 1 is a schematic diagram of a portion of a control system of the invention that includes MCUs (monitor and control units) in a portion of a guideway, a carrier and a load.

FIG. 1 illustrates portions of a control system 10 of the invention. The system 10 is designed for use along guideways for automated control of carriers moving there-along. The guideways might be like conventional roadways and the carriers might be vehicles such as automobiles moving along such roadways. However, the invention is particularly designed for use along elevated or otherwise dedicated guideways that support carriers each carrying a load such as a passenger cabin, a cargo container or pallet or a car, light truck, SUV or other vehicle. My U.S. Pat. Nos. 5,590,604, 5,706,735, 5,979,334 and 6,622,635 provide examples of such guideways and carriers. (Carriers are referred to as "carrier vehicles" in my patents). My patents also provide examples of important features including control of steering, control of traction, control of tilt of loads, transfer of loads to and from carriers and weighing of carriers. The disclosures of my said patents are incorporated by reference.

Examples of guideways and carriers are also provided in my U.S. Pat. No. 8,272,331 issued Sep. 25, 2012, entitled "AUTOMATED TRANSPORT SYSTEM", the disclosure thereof being incorporated by reference.

The design of the system 10 is such that it is highly versatile with respect to features that may be used, types of loads that can be carried, dimensions of carriers and loads, weight-carrying capabilities of carriers, speeds and other factors. Each load is automatically carried on demand and at high speed to a selected destination. The design facilitates expansion and interconnection of guideways to form a wide-scale network. The design also facilitates reliable movement of carriers to desired destinations within a wide-scale network of guideways. The system is flexible, resilient and robust. The likelihood of failures is minimized. The effects of failures that might occur are localized to prevent breakdown of a complete system or of any substantial portion of a complete system.

FIG. 1 includes block diagrams of electrical circuitry of one carrier 11 and one load 12. FIG. 1 also includes a diagram of portions of left and right control means 13 and 14 located along a portion of a guideway that is generally indicated by reference numeral 16. The left and right control means 13 and 14 are positioned in different ways and perform different functions depending upon their locations in a system. They are particularly important in convergent and divergent Y-junctions. In a convergent Y-junction, the left and right control means may be extensions of single left and right control means respectively located along left and right side portions of left and right guideways from which carriers enter. The carriers entering from such left and right guideways may merge in the convergent Y-junction and exit on a single guideway to be controlled by drive data from either or both of the left and right control means 13 or 14.

In a divergent Y-junction, a carrier may initially receive the same drive data from both the left and right control means 13 and 14 but if steer data have been sent to the carrier for a steer to either the left or right, the carrier will respond and continue to respond only to drive data from the left or right control means indicated by the steer data. In this case, the left exit guideway will have a control means along its left side that forms an extension of the left control means 13 and the right exit guideway will have a control means along its right side that forms an extension of the right control means 14. Both left and right control means are preferably provided between junctions for redundant control and safety and reliability. If no drive data are supplied from one of the left and right control means, the carrier will respond to drive data from the other of the left and right control means. The carrier may then also send error data to the monitoring MCU to be sent to a central control.

In FIG. 1 the left control means 13 is shown as including three monitoring and control units (MCUs) 17, 18 and 19 while the right control means 14 is shown as including three MCUs 20, 21 and 22. These and other MCUs are assigned to contiguous regions along the length of guideways and can operate without central control to perform all essential control functions of the system. Each MCU stores program data and control data that may depend upon its location in the system. The control data in MCUs preceding and within divergent Y-junctions may include data for comparison with destination data obtained from a passing carrier to determine the proper path through the divergent Y-junctions and to effect steering of carriers through such paths. Preferably, on-board steering means are used in carriers to avoid use of switching means in guideways.

MCUs of the system control the speed/acceleration of carriers to maintain at least a proper following distance between each carrier and a carrier ahead. MCUs of the system also control merging of movements of carriers from two guideways through a convergent Y-junction.

Communications between the MCUs and the carrier 11 are preferably through wireless coupling means and most preferably through inductive coupling arrangements similar to those shown in FIGS. 68-70 and described at column 51, line 21 to column 55, line 54 of my aforementioned U.S. Pat. No. 5,590,604. In FIG. 1, reference numerals 25 and 26 indicate inductive coupling devices which may have constructions similar to those of devices 943-946 of U.S. Pat. No. 5,590,604. Devices 25 and 26 are diagrammatically shown as being coupled to conductors 27 and 28 of transmission lines that include grounded conductors 29 and 30 which may be like the plate 942 of U.S. Pat. No. 5,590,604 that is covered by a layer of dielectric material 941. Opposite ends of the conductor 27 are connected through resistors 31 and 32 to ends of the grounded conductor 29 while opposite ends of the conductor 28 are connected through terminating resistors 33 and 34 to ends of the grounded conductor 30. Input and output terminals of the MCU are respectively connected to center points of the conductors 27 and 28. The input and output impedances at such terminals and the values of the terminating resistors 31-34 are preferably equal to the characteristic impedances of such transmission lines. The objective is to obtain uniform transmission of signals along the lengths of the transmission lines formed by conductors 27, 28 and conductors 29, 30 and between the devices 25 and 26 and the terminals of the MCU 18.

For communications to and from the MCU 21, an additional pair of inductive coupling devices 35 and 36 are provided that are like the devices 25 and 26 and that are inductively coupled to additional transmission lines that are like those formed by conductors 27, 28 and conductors 30, such additional transmission lines having center points connected to input and output terminals of the MCU 21. Similar transmission lines are provided communications between devices 35 and 36 and the MCUs 20 and 22 and other similarly located MCUs.

The carrier 11 includes circuits 38 that include a processor circuit, a memory circuit and input/output circuits. Outputs or circuits 38 are connected to devices 25 and 35. Inputs of circuits 38 are connected to devices 26 and 36. The carrier 11 also includes a pulse generator 39 that develops pulses at a rate proportional to the speed of travel of the carrier 11. Such pulses may be developed by a speed-wheel similar to speed-wheels used in automobiles for cruise control and automatic braking systems. The pulses are applied to the MCUs through the devices 26 and 36, preferably through modulation of a high frequency carrier signal, and are used in MCUs to measure distances of travel of carriers after detection. Such pulses are also supplied to the processor, memory and I/O circuits 38 which may develop speed and acceleration data for use in control of drive of the carrier 11 and also for transmission through devices 25 and 35 to the MCUs 18 and 21.

The processor circuits of circuits 38 are connected through the I/O circuits thereof to circuits 40 for control of functions including drive, steering, traction and tilt. Other functions may be controlled by circuits 40 including weighing and load-transfers. The load 12 is coupled to the carrier 11 by a connector 42 which may include locking means that can be released to allow transfer of loads to and from the carrier 11. The load 12 includes circuits 43 which include processor, memory and I/O circuits that are connected through connection means in the connector 42 to the processor, memory and input/output circuits of circuits 38 of the carrier 11. Such connection means may include direct connections or may include wireless signal transmission means. The processor, memory and input/output circuits of circuits 43 of the load 12 are connected to a loading control circuit 44. In loads in the form of passenger cabins, the circuit 44 may control doors, lights, heating/air conditioning, communications, selection of destinations and other functions.

Remote input/output devices 45 and 46 may be provided for wireless communications with the processor, memory and input/output devices for direct control of operations, for examining data stored in memories and for entering data in memories, including destination data. When a destination is selected by a passenger, the processor circuits of circuits 43 of the load operate to enter corresponding destination into the memory circuits of the circuits 43. Through control by the processor circuits of circuits 38 of the carrier, data in the memory circuits of circuits 43 including data identifying the load 12 and also including destination data, whether obtained from a passenger or from the input/output device 46, may be down-loaded to the memory circuits of circuits 38 of the carrier 11. The processor circuits of the circuits 38 of the carrier may thereafter operate to download data in the memory circuits of circuits 38 the memory of a MCU that is monitoring and controlling the carrier 11, destination data being usable by the processor circuits of the circuits 38 for determining data for control of steering through a divergent Y-junction ahead and for applying such data to steer control circuits of the circuits 40.

Activation by the carrier 11 of MCUs along the guideway is achieved through an arrangement shown diagrammatically in FIG. 1 and through which movement of the carrier 11 past certain positions causes a signal to be developed and applied to each MCU of a pair of a left and right pair of MCUs. In effect, such positions define the boundaries of contiguous regions of operations of the MCUs with respect to control of a carrier. Two markers 47 and 48 are positioned on the carrier 11 to move in paths in proximity to detectors along the guideway that are connected to MCUs to apply signals when the carrier 11 moves past certain positions along a guideway. Three detectors 49, 50 and 51 are shown connected to MCUs 17, 18 and 19 of the left control means 13. Three detectors 52, 53 and 54 are shown connected to MCUs 20, 21 and 22 of the right control means 14. The detectors 49-54 may be in the form of eddy current probes while the markers 47 and 48 may be projecting metallic members. Alternatively or in addition, optical and other means may be used for detecting movements of carriers past certain positions along a guideway.

In certain circumstances only a left control means and associated detectors or only a right control means and associated detectors may be present. Both markers are always carried by the carrier 11 and available for detection.

The carrier 11 is shown in FIG. 1 at a position beyond a transitional position at which the markers 47 and 48 were detected by the detectors 50 and 53 and at which the inductive coupling devices were coupled to portions of the transmission lines connected to MCUs 18 and 21 that overlap transmission lines connected to MCUs 17 and 20. The operation is such that prior to detection of movement past that transitional position, circuits in the MCUs 17 and 20 were active and is such that in response to detection of that transitional position the MCUs 18 and 21 were activated to assume control of the carrier 11 while applying signals through lines 55 and 56 to deactivate control of the carrier 11 by the MCUs 17 and 20. In a similar manner control of the carrier 11 will transition from the MCUs 18 and 21 to MCUs 19 and 22 in response to detection of the markers 47 and 48 by the detectors 51 and 54 and deactivation of MCUs 18 and 21 through lines 57 and 58. The overlapping of the transmission lines facilitates smooth and reliable transitions of control from one MCU to another MCU or from one pair of MCUs to another pair of MCUs, avoiding any interruptions in control.

It is noted that as indicated by line 60 a connection may be made to many MCUs for communicating data to a central point for tracking movements of carriers and loads, billing, keeping a record for analysis of performance and for reports of errors or problems and other purposes. The same or a similar line may also be used, preferably with reliable security precautions, for communicating control data to MCUs including, for example, data that defines maximum speeds to be attained and data that defines safe-following distances to be attained in certain portions of a system.

MCUs of the system control the speed/acceleration of carriers to maintain at least a proper following distance between each carrier and a carrier ahead. As an example, the MCUs 18 and 21, after detection of a passing carrier 11 by the detectors 50 and 53, periodically generate detected carrier data. Detected carrier data includes data sent from the carrier 11 to the MCUs as to the speed of the passing carrier 11. Detected carrier data also includes data as to the distance which the passing carrier 11 has moved since its detection. That distance is determined from counters in the MCUs 18 and 21 that count pulses sent from pulse generator 39 of the carrier 11 after detection of the carrier by detectors 50 and 53. As indicated by lines 61 and 62, detected carrier data are sent rearwardly from the MCUs 18 and 21 to the MCUs 17 and 20. MCUs 17 and 20 and relay the data rearwardly through preceding MCUs each adding data corresponding to the length thereof. When the accumulated data reaches MCUs that have detected a preceding passing carrier and are thereby active, data as the length of the region of those MCUs is added while deducting data as to the distance the preceding carrier has moved since detection. The result is accumulated data that accurately reflects the distance from the preceding carrier to the carrier ahead, the carrier 11 in this example, from which the detected carrier data was originally generated.

From detected carrier data originally generated from a carrier ahead of the carrier 11, the MCUs 18 and 21 receive accumulated data sent rearwardly through connections 63 and 64 from MCUs 19 and 22 that have received accumulated data through connections 65 and 66 from MCUs that either detected the carrier ahead or that received data from MCUs further ahead, each MCU being operative to add data equal to the length of its region. To data received through connections 63 and 64, the MCUs 18 and 21 add data as to length of their region and deduct the distance the carrier 11 has moved since detection by the detectors 50 and 53, thereby making an accurate determination of the actual distance from the carrier 11 to the carrier ahead.

The actual following distance data so developed by MCUs 18 and 21 are compared with a data as to a safe following distance which is based in part upon the speed of the carrier ahead. If such comparison shows a following distance that is too close, data are sent to the carrier behind to slow it down until its speed equals that of the carrier ahead and it is at the safe following distance behind. If the actual following distance is greater than a safe following distance, data may be sent to the carrier behind to speed it up until the safe following distance is achieved or until the speed of the carrier behind reaches a maximum allowable value.

Accurate control of following distance is facilitated by the periodic generation of data that includes data as to the distance which a carrier has followed since detection. A related feature of the invention involves the generation and use of data that permits use of carriers and loads with various different length dimensions. In accordance with this feature, the detected carrier data as to a carrier ahead includes data as to the distance from a reference point of the carrier ahead to a rearward end of the carrier or the load it carries whichever is more rearward. The detected carrier data as to a carrier behind includes data as to the distance from reference point of the carrier behind to the forward end of the carrier or the load it carries whichever is more forward. When such data are included and when distances of movement of carriers after detection are measured with respect to the aforementioned reference points, following distance can then be measured from the forward end of the carrier behind or the load it carries, whichever is more forward, to the rearward end of the carrier ahead or the load it carries, whichever is more rearward.

Figure 2:
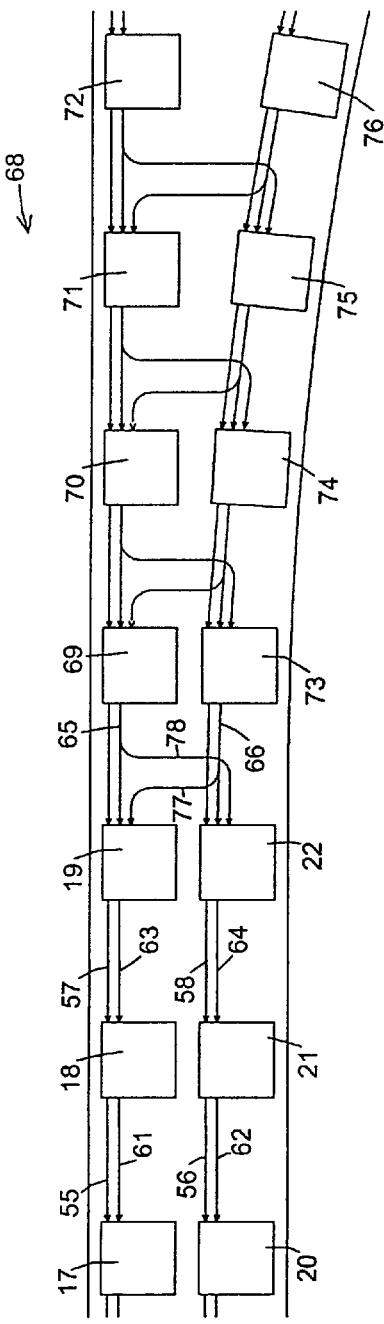
FIG. 2 is a schematic diagram of a portion of the control system that includes a divergent Y junction.

FIG. 2 is a diagram showing the use of the MCUs 17-22 located just behind where exit guideways start to diverge in a divergent Y-junction generally indicated by reference numeral 68. The MCUs of the left control means 13 are shown followed by a series of MCUs 69-72 for a left exit guideway while MCUs 20-22 of the right control means 14 are shown followed by a series of MCUs 73-76 for a right exit guideway. For simplicity, transmission line conductors 27-30, coupling devices 25, 26, 35 and 36 and detectors 49-54 are not shown. However, connections 55-58 are shown that are used to disable control by one of the MCUs 17, 20, 18 and 21 when control is assumed by a MCU ahead and connections 61-66 are shown that are used to send data rearwardly to MCUs 17, 20, 18, 21, 19 and 22. Corresponding connections are shown for the MCUs 69-76.

Control data in MCUs 17-22 and preceding MCUs may include data for comparison with destination data obtained from a passing carrier to determine the proper path through the divergent Y-junction 68 and to effect steering of the carrier through such paths along with control by either the MCUs 17-19 and following MCUs 69-72 of the left control means or the MCUs 20-22 and following MCUs 73-76 of the right control means. With pairs of left and right MCUs operating as shown and described each can determine the speed of and distance to a carrier ahead moving on a selected left or right exit path and can control a passing carrier to maintain a safe following distance behind the carrier ahead. With this feature and with on-board control of steering, a carrier moving at high speed can follow at a safe distance behind another carrier into a divergent Y-junction but exit on an opposite exit guideway.

However, there is a potential for problems due to slowing down or stopping of carriers on one exit guideway. Even though separate, exit guideways can be close enough together for substantial distances to allow carriers moving on one to be in the path of carriers moving on the other. To avoid a problem, cross-connections 77 and 78 are respectively provided between additional inputs of the left and right MCUs 19 and 22 and the connections 66 and 65 to inputs of the right and left MCUs 22 and 19. With the addition of the cross-connections 77 and 78, each of the MCUs 19 and 22 can obtain data as to the speed of and distance to carriers ahead on both exit guideways and control a passing carrier, if any, to maintain a safe following distance behind the carrier that is the least distance ahead. If no vehicle is passing MCU 19 or MCU 22 carrier ahead data may be sent rearwardly from MCU 19 or MCU 22 and through connection 63 or connection 64 to the MCU 18 or 21. The cross-connections 77 and 78 between MCUs 19 and 22 may be more than adequate in most circumstances but for additional security, similar cross-connections may be provided as shown between MCUs 69 and 73, between MCUs 70 and 74, and between MCUs 71 and 75. With such cross-connections, MCUs as far forward as MCUs 71 and 75 can obtain data as to the speed of and distance to carriers ahead on either exit guideway. If the two exit guideways are close together for more extended lengths in the forward direction, additional cross-connections can be provided between MCUs 72 and 76 and pairs of MCUs positioned forwardly therefrom.

Figure 3:
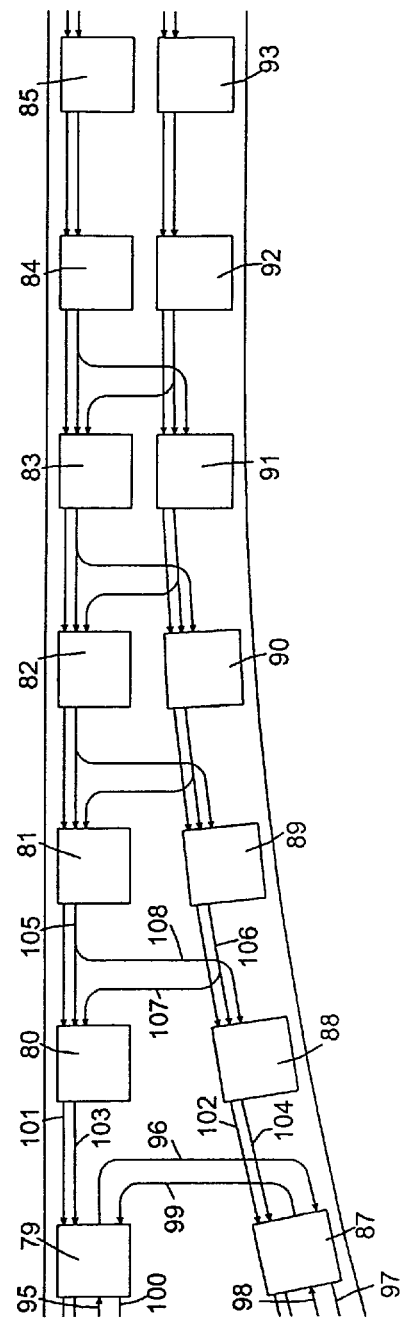
FIG. 3 is a schematic diagram of a portion of the control system that includes a convergent Y junction.

Important features of the invention relate to control of merging of movements of carriers from two guideways though a convergent Y-junction. Means are provided for comparison of data obtained from each carrier moving along one guideway with data previously obtained and collected from carriers moving along the other of the two guideways to detect any potential for a collision in a merge region and to take appropriate remedial action to avoid any collision FIG. 3 is a diagram showing the use of MCUs in a convergent Y-junction that may be envisioned as being at the end of monitored and controlled portions of left and right entrance guideways that merge into a single exit guideway. For control of merging, data are collected by MCUs as to carriers moving along each guideway and are processed by MCUs along the opposite guideway for appropriate control of carriers moving along the opposite guideway. The collection takes place during movement of data from one MCU to another toward a merge point. The collected data are moved to all MCUs along the opposite guideway, starting at the merge point and moving back away from the merge point. As will be explained in connection with FIGS. 12 and 13, the processor of each MCU along the opposite guideway that is in active control of a passing carrier examines the collected data and takes any action that is appropriate for avoiding collision with any merging carrier. The MCUs 79-83 shown by rectangles in FIG. 3 may be along left control means of the left entrance guideway and followed by MCUs 84 and 85 that are along left control means of the exit guideway. MCUs 87-91 may be along right control means of the right entrance guideway and followed by MCUs 92 and 93 that are along right control means of the exit guideway.

It is important that collecting and processing of merging data take place along portions of guideways of sufficient length to allow gradual adjustments of speeds of carriers such as insure that they reach a merge region in properly spaced non-interfering relation. As an example, merging adjustments may be made along a distance of 2000 feet with fifty MCUs each monitoring a length of forty feet. Thus each of the MCUs 79 and 87 may be preceded by forty-nine MCUs that collect and process merging data.

In FIG. 3, a connection 95 is shown to MCU 79 through which data collected from forty-nine preceding MCUs of the left control means of the left guideway may be applied. Each of such preceding MCUs may have added data as to a passing carrier, if any, and may have sent the resulting collected data through a connection to the following MCU. To the data collected by the preceding forty-nine MCUs, the MCU 79 may add data as to a passing carrier, if any. However, rather than sending the resulting collected data to the following MCU 80, the collected data is sent through a connection 96 to the MCU 87 of the right control means of the right guideway. The MCU 87 then processes the data and sends the data rearwardly through a connection 97 to the first of forty-nine preceding MCUs of the right control means of the right guideway to be processed by each MCU and to be sent rearwardly until reaching an end MCU. In processing of the data, each MCU of the right control means determines whether there is any potential conflict with a carrier moving along the left guideway and takes such action, if any, that may be appropriate.

In collecting data and processing data, the MCUs of the control means of each guideway may operate in the same manner as the MCUs of the control means of the opposite guideway. The data collected by the forty-nine MCUs that precede MCU 87 may be applied to MCU 87 through a connection 98. MCU 87 may thereafter apply the collected data through a connection 99 to the MCU 79 which processes the collected data and through a connection 100 sends it rearwardly to preceding MCUs of the left control means of the left guideway for processing.

As with FIG. 2, transmission line conductors, coupling devices and detectors are not shown in FIG. 3 but it will be understood that they are provided. It will also be understood that the configuration is such that a carrier moving along the left entrance guideway will be detected only by the MCUs 79-83, that a carrier moving along the right entrance guideway will be detected only by the MCUs 87-91 and that carriers moving along the exit guideway will be detected by both MCUs 84 and 85 and MCUs 92 and 93.

Connections 101 and 102 are shown in FIG. 3 that are used by MCUs 80 and 88 to disable the MCUs 79 and 87 as well as connections 103 and 104 that are used to send data as to carriers ahead back to MCUs 79 and 87, also connections 105 and 106 that are used to send data as to carriers ahead back to MCUs 80 and 88. For each of the other MCUs that are shown, connections corresponding to connections 101-104 are shown but not numbered. In addition to such connections, cross-connections 107 and 108 like the cross-connections 77 and 78 of FIG. 2 are provided between additional inputs of the MCUs 80 and 88 and the connections 105 and 106. With the cross-connections 107 and 108, each of the MCUs 80 and 88 can obtain data as to the speed of and distance to carriers ahead on both left and right guideways and determine which of such carriers presents a greater potential collision problem and reduce the speed of a controlled carrier accordingly. Cross-connections like cross-connections 107 and 108 may be provided as shown between inputs of MCUs 81 and 89, between inputs of MCUs 82 and 90 and between inputs of MCUs 83 and 91. The MCUs 84 and 85 and the MCUs 92 and 93 are in left and right control portions of the exit guideway so that both can detect a carrier moving in the exit guideway. It is noted that the cross-connections as shown and described may not be necessary. With data collection and processing operations as described it is very unlikely that carriers detected by MCUs 80-83 of the left control means and those detected MCUs 88-91 of the right control means will be in interfering relation. However, it may be possible that a carrier that is moving very slowly or stopped could cause a problem and the cross-connections as described and shown may preferably be provided.

Figure 4:
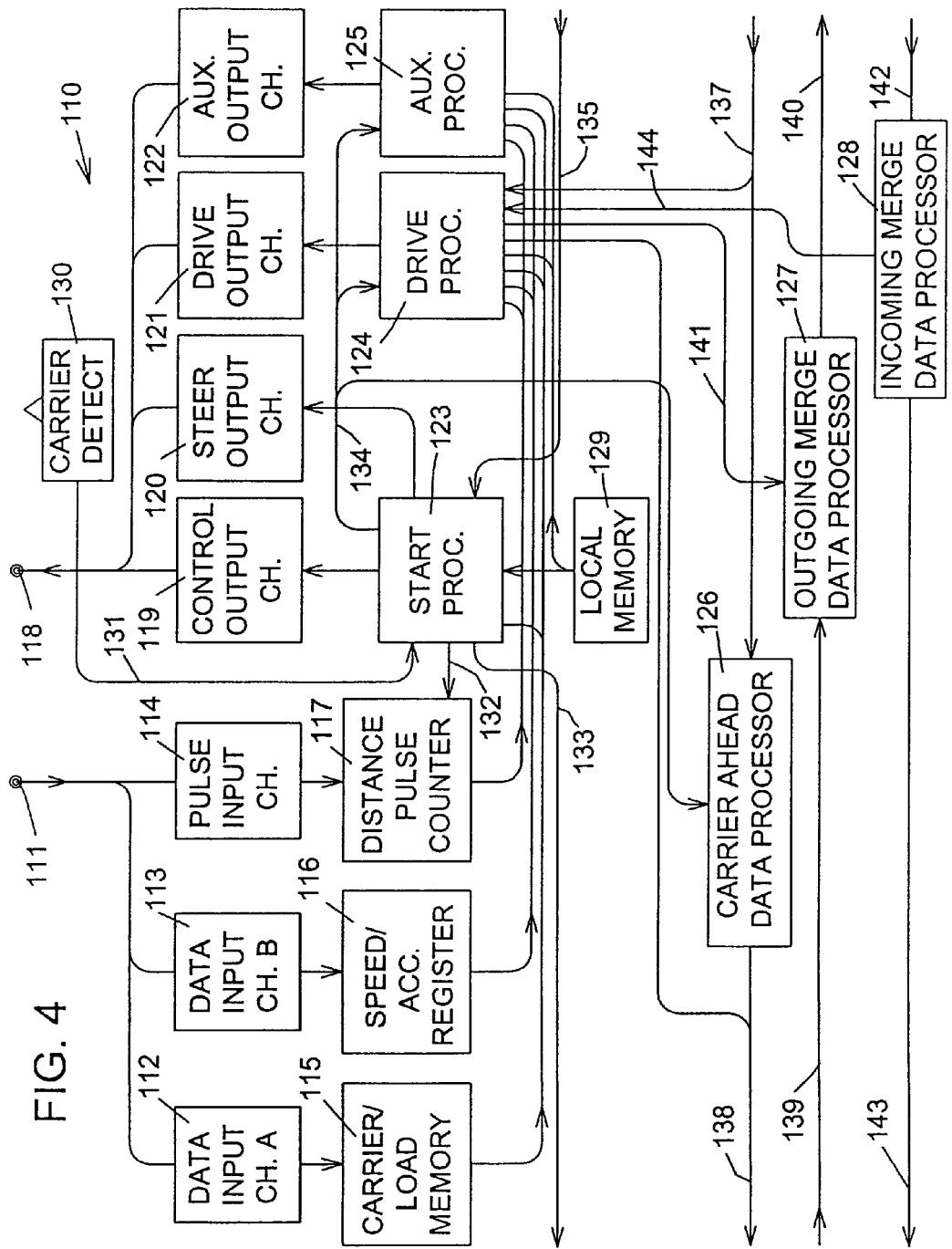
FIG. 4 is a schematic block diagram of electrical circuitry of a MCU.

FIG. 4 shows the circuitry of a MCU 110 which may be considered to be a general purpose MCU. By enabling or disabling of certain components or with other modifications, it might be used as any one of the MCUs of FIG. 1, 2 or 3. A data input terminal 111, which may be connected to a center point of a transmission line conductor such as conductor 27 in FIG. 1, is connected to two data input channels 112 and 113 and a pulse signal channel 114. The channels 112 and 113 may receive and demodulate carrier signals of two different high frequencies for transmission of data. The channel 114 may receive and demodulate a carrier signal at a third high frequency for supplying pulses.

Data input channel 112 is used for download of data to a carrier/load memory 115. Such data may include identifications of the carrier 11 and load 12, the capabilities of the carrier 11 with respect to speed and weight-carrying capacity, the maximum forward and rearward projections of the carrier and load from a reference point and other data that will not change while the carrier is being monitored and controlled by the MCU 110.

Data input channel 113 is used for download of speed/acceleration data to a register 116. Such data may be generated by the carrier from the pulse generator 39 which may include a speed wheel driven from movement of the carrier 11 along a guideway. The pulse generator 39 may also include means for generating a carrier signal that is modulated by pulses and applied to an inductive coupling device such as device 25 in FIG. 1.

The pulse signal input channel 114 demodulates the carrier signal generated by the pulse generator 39 to develop pulses that are applied to a counter 117. Each pulse may represent a certain distance of travel of the carrier 11, e.g. one inch. The count registered by the counter 117 at any time is proportional to the distance of travel of the carrier 11 since a reset performed in response to detection of the carrier by the MCU 110.

A data output terminal 118, which might be connected to the center point of a transmission line conductor such as conductor 28 in FIG. 1, is connected to a control data output channel 119, a steer data output channel 120, a drive data output channel 121 and an auxiliary data output channel 122. The output channels 119-122 may include means for generating carrier signals at different high frequencies, each carrier signal being modulated by digital data to be sent to the carrier 11.

Six processors are shown in FIG. 4: a start processor 123, a drive processor 124, an auxiliary processor 125, a carrier ahead data processor 126, an outgoing merge data processor 127 and an incoming merge data processor 128. A local memory 129 supplies data to the start, drive and auxiliary processors 123, 124 and 125 which also obtain data from the carrier/load memory 115, the speed/acceleration register 116 and the distance pulse counter 117.

When a carrier moves past the MCU 110, it is detected by a carrier detect circuit 130 that supplies a signal through line 131 to the start processor 123. The start processor 123 sends data through the control output channel 119 to effect a download of data from the carrier to the carrier/load memory 115. If a divergent Y-junction is ahead the drive processor 123 then sends steering controls through the steer output channel 120 to the carrier 11. The drive processor 123 then sends a reset signal through a line 132 to the distance pulse counter 117. Finally, the drive processor sends periodic pulses through line 134 to activate the drive and auxiliary processors 121 and 122 and to signal to the carrier ahead data processor 126 that the MCU 110 is in active control of a passing carrier.

As shown in flow diagrams of FIGS. 6, 7 and 8 and as described hereinafter, the drive processor 124 determines the value of an acceleration signal for obtaining a safe speed and a safe following distance behind a carrier ahead and, if the MCU 110 is in a merge zone, the value of an acceleration signal obtaining a proper relation to a potentially interfering merging carrier. The lessor of such signals, i.e. that which causes a greater deceleration, is sent through the output channel 121 to the carrier 11.

Data as to the speed of and distance to a carrier ahead is received through a line 137 from a MCU ahead, either by the drive processor 124 when active or by the carrier ahead data processor 126 when the drive processor 124 is inactive. When the drive processor 124 is active it uses the speed/distance data to determine the value of an acceleration signal. Processor 124 when active also develops speed/distance data relating to a passing carrier and sends such data to the MCU behind through a line 138. When the drive processor 124 becomes inactive, the carrier ahead data processor 126 is activated to receive the speed/distance data on line 137 from the MCU ahead and to send to the MCU behind through line 138, after adding the length of the monitored region of the MCU to the distance portion of the data. Activation of the carrier ahead data processor 126 is controlled through connection to the pulse output line 134 of the start processor 123. When pulses are applied through line 134, the carrier ahead data processor 126 is deactivated. When such pulses are not applied, the processor 126 is activated.

The outgoing merge data processor 127 receives merge data through a line 139 from a MCU behind and sends the merge data through a line 140 to a MCU ahead after adding stored data relating to a passing carrier and previously received through a line 141 from the drive processor 124. The incoming merge data processor 128 receives merge data through a line 142 from a MCU ahead that was previously collected from an opposite guideway and sends such merge data through a line 143 to a MCU behind after storing such merge data for access by the drive processor 124 through a line 144. With reference to FIG. 3, the MCU 110 may be used as either the MCU 79 or the MCU 87 or any of the MCUs which are in a merge region and behind either the MCU 79 or the MCU 87. If used as the MCU 79, the lines 135, 137, 139, 140, 142 and 143 respectively correspond to lines 101, 103, 95, 96, 100 and 99. If used as the MCU 87, the lines 135, 137, 139, 140, 142 and 143 respectively correspond to lines 102, 104, 98, 99, 96 and 97.

Figure 5:
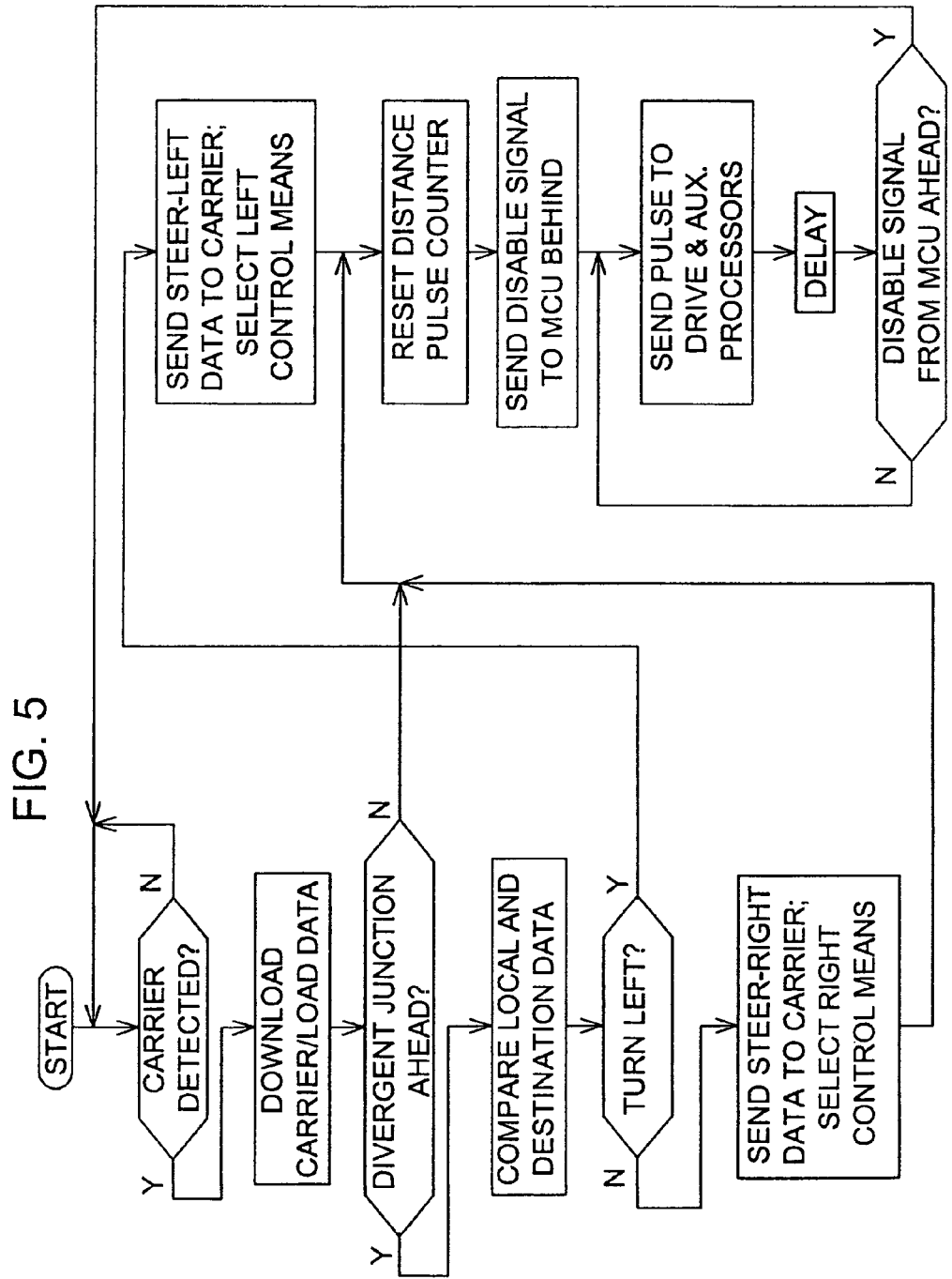
FIG. 5 is a flow diagram showing the operation of a start processor of the MCU of FIG. 4.

The operation of the start processor 123 is shown by the flow diagram of FIG. 5. In response to a signal from the carrier detect circuit 130, the processor 123 supplies request data to the carrier 11 through the control output channel 119 to cause a download of data through data input channel 112 to the carrier/load memory 115. If a divergent Y-junction is ahead, the start processor may compare local data with destination data to determine the direction of movement of the carrier through the junction. Destination data is typically included in the data downloaded to the carrier/load memory 115 which supplies it to the start processor 123 for comparison with data supplied from the local memory 129. Depending upon the results of the comparison, either steer-left or steer-right data is supplied through the steer output channel 120 to the carrier which then operates electro-mechanical means to cause the carrier to move on either the left or right exit guideway. At the same time, the carrier responds to drive data from the corresponding control means, either left or right control means such as control means 13 or 14 of FIG. 1.

After effecting the proper steering controls, or if no divergent junction is ahead, the start processor 123 sends a reset signal through a line 132 to the distance pulse counter 117. The processor 123 also develops a signal on a line 133 that operates to disable control by the MCU behind. The start processor 123 then sends a pulse through a line 134 to the drive, auxiliary and carrier ahead data processors 124, 125 and 126. After a delay, the sending of the pulse is repeated. The delay of each repeat of the pulse plus the duration of the pulse may be 10,000 microseconds, for example, the pulse being repeated at a 100 Hz rate until a disable signal is received through a line 135 from the MCU ahead.

Figure 6:
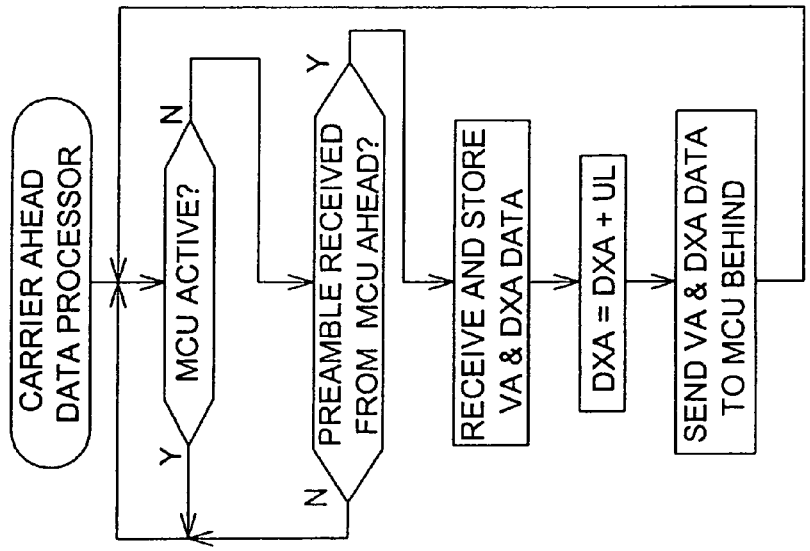
FIG. 6 is a flow diagram showing the operation of a carrier ahead data processor of the MCU of FIG. 4.

FIG. 6 is a flow diagram for the carrier ahead data processor 126. When a drive processor of an MCU is inactive, i.e. when no passing carrier is detected, the carrier ahead processor 126 of that MCU looks for receipt of a preamble from the MCU ahead and, upon receipt, receives and stores VA & DXA data. VA data corresponds to the speed of the carrier ahead. DXA data corresponds to the distance from the forward end of the monitored region to the rear end of a carrier ahead. The DXA data is then increased by UL data which corresponds to the effective length of the region monitored by the MCU The VA data and the increased DXA data are then sent to the MCU behind. The MCU behind will then have data corresponding to the distance to a carrier ahead and, if a drive processor thereof is active, may determine appropriate control data to be sent to a passing carrier. If not, distance data is sent rearwardly and may be relayed through and increased by a number of MCUs before reaching a MCU which has an active drive processor.

Figure 7:
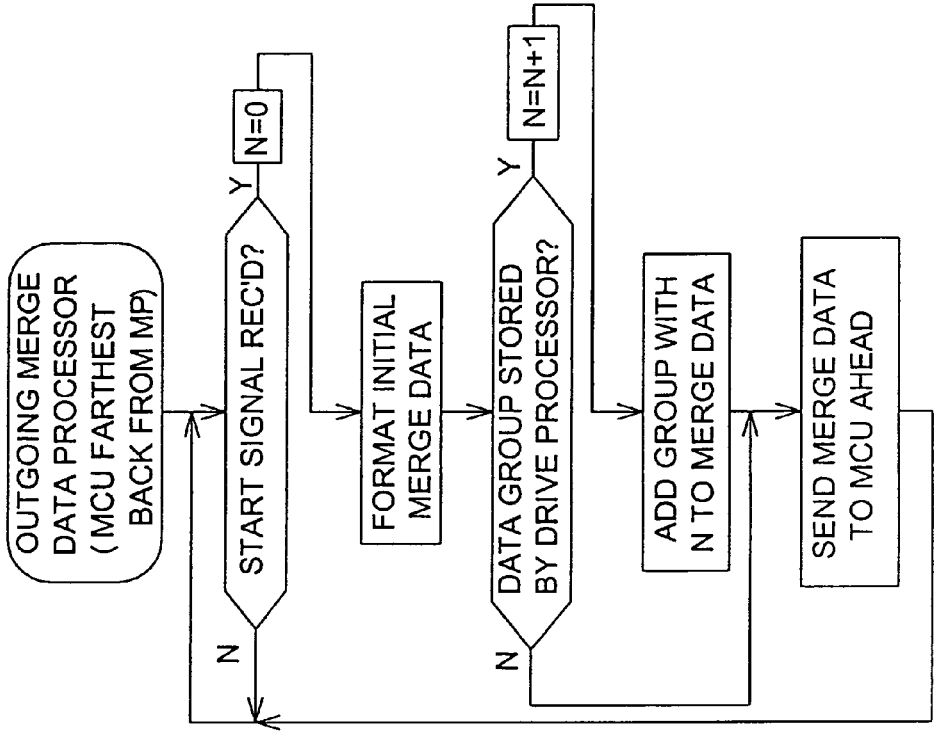
FIG. 7 is a flow diagram showing the operation of one type of outgoing merge data processor for the MCU of FIG. 4.

FIG. 7 is a flow diagram of an outgoing merge data processor 127 of a MCU which is in a merge zone and which is the MCU furthest away from a merge point MP. As shown, this MCU looks for a start signal which is generated periodically to initiate a collection of merge data. Upon receipt of a start signal, a group identifying number N is made equal to zero and initial merge data is formatted. If the MCU has been active as to a passing carrier, it will have stored a corresponding data group which will, among other things, indicate the expected time of arrival of the passing carrier at the merge point. Such stored data will be added to merge data along with N which will be increased from zero to one. The merge data will be then sent to the MCU ahead, preceded by a preamble.

FIG. 8 is a flow diagram for an outgoing merge data processor 127 of each MCU which is ahead of the MCU for which the flow diagram of FIG. 7 is appropriate. In each case, the existence of a stored merge data group will result in its addition to the merge data along with an N which is increased by one. When the MCU that is closest to the merge point in one guideway has received and stored the merge data and has added any group data that may be appropriate, it will send the collected merge data to the MCU which is closest to the merge point in the opposite guideway. An incoming data processor of that MCU of the opposite guideway will then initiate processing of the collected merge data.

FIGS. 9 and 10 are flow diagrams showing the processing performed by incoming merge data processors 128 of the opposite guideway. FIG. 9 shows the operation of the incoming merge data processor of the MCU closest to the merge point. FIG. 10 shows the operation of the incoming merge data processors of the each of the other MCUs that are behind the one closest the merge point and that are in the merge zone. With the operations as shown, each MCU in the merge zone along each guideway has access to the merge data collected from N MCUs as to N carriers moving along the other guideway.

Figure 11:
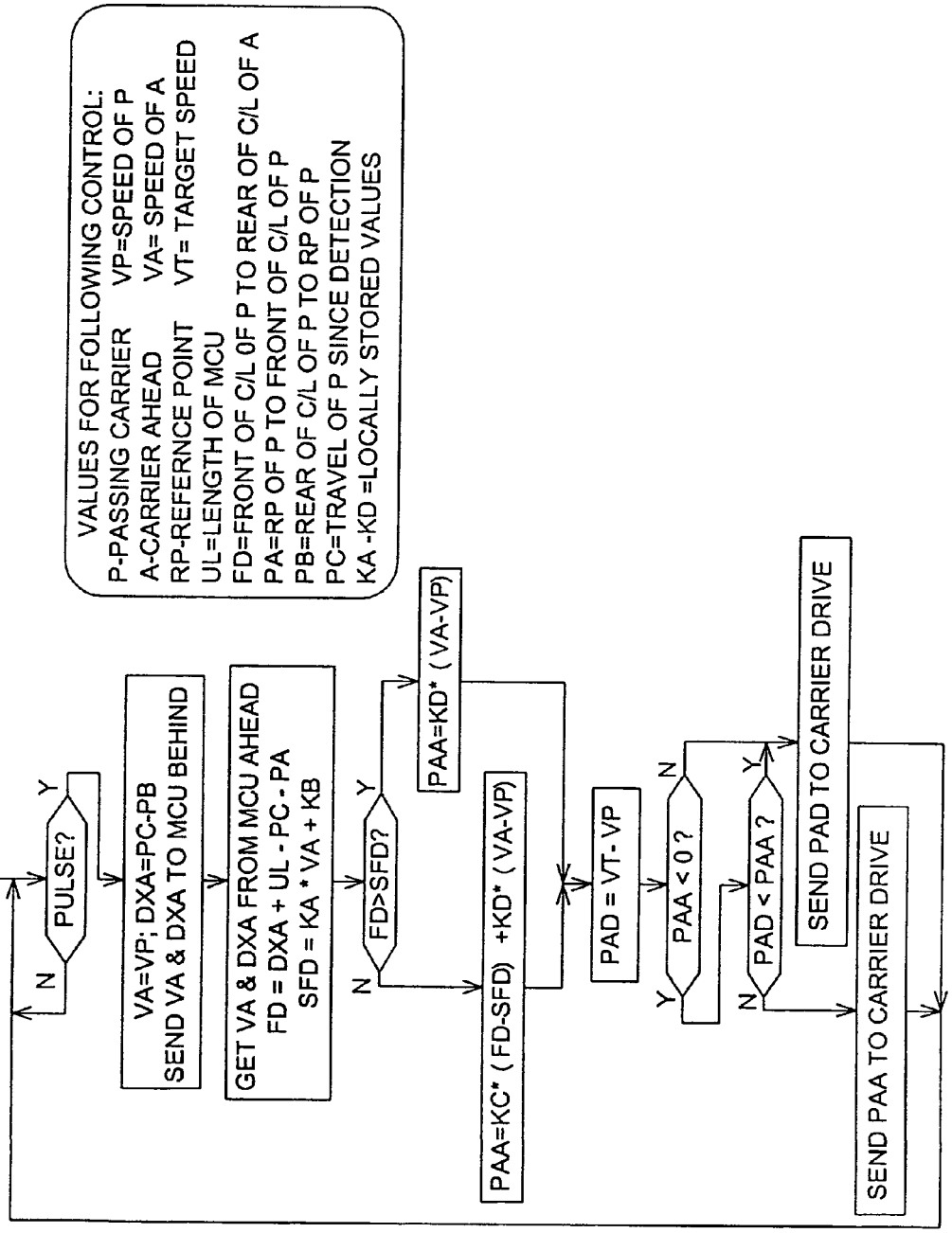
FIG. 11 is a flow diagram showing the operation of one type of drive processor for the MCU of FIG. 4.

FIG. 11 is a flow diagram showing the operation of a drive processor 124 which may be along a portion of a guideway which is not in a merge zone or in an acceleration or deceleration zone. In such conditions, it is desirable that each carrier should move at a relatively constant target speed VT and slow down only as necessary to follow at a safe distance behind a carrier ahead and at a speed no greater than that of a carrier ahead. Upon detection of a pulse from the start processor 123 the first step is to determine VA and DXA data to be sent to the MCU behind. VA is made equal to VP, the current speed of a passing carrier. When sent rearwardly and received by an active MCU, VA will correspond to the speed of a carrier ahead. The DXA data is made equal to PC−PB, PC being the distance a passing carrier has traveled since detection and PB being the distance from the rearward end of a passing carrier or the load it carries to a reference point of the passing carrier.

When the VA and DXA data are sent rearwardly, each MCU that is inactive will increase DXA by its effective length UL and send the increased DXA rearwardly as explained in connection with FIG. 6. As shown it FIG. 11, when the VA and DXA data reach an active MCU, that MCU can determine the following distance FD to the MCU ahead by adding its effective length UL to DXA and subtracting PC and PA. PC is the distance the passing carrier has traveled since detection and PA is the distance from the reference point of the passing carrier to the forward end of the passing carrier or the load it carries. As also shown in FIG. 11, the active MCU can also determine a safe following distance SFD as equal to the product of a constant KA and the speed VA of the carrier ahead, plus a constant KB that establishes a minimum following distance. By way of example, KA may be 0.76 and KB may be 10 feet, producing a following distance of 105 feet when VA is 125 feet/second. This is the following distance obtained when passing carriers are moving at 125 feet/second and at one second intervals and when the effective lengths of the carriers and loads are uniformly 20 feet.

After determining the FD and SFD values, two acceleration values PAA and PAD are determined for alternative use in controlling acceleration of the active carrier. If FD is greater than SFD, PAA is the product of a constant KD and VA−VP. If FD is not greater than SFD, PAA is determined as the sum of two values, one being the product of a constant KC and FD minus SFD, the second being the product of the constant KD and VA−VP. Both values may be zero if the following distance and speed values FD and VP are of safe magnitude. Since FD is not greater than SFD, the first value cannot be positive but it may be negative if the actual following distance FD is less than the safe following distance SFD. The second value may be negative if the speed VP of the passing carrier is greater than the speed VA of the carrier ahead. If both values are negative, the acceleration value PAA may be negative and of relatively high magnitude to rapidly decelerate a passing carrier.

After determining PAA, PAD is determined as VT−VP. Then tests are performed as shown to determine whether PAA or PAD should be sent to the carrier drive. The value of the lesser magnitude, i.e. that which causes the greater deceleration, is sent except when the PAA value zero and the following distance and speed are safe. In that case the program sends the PAD value which may be positive to cause acceleration of the carrier toward the target speed.

Figure 12:
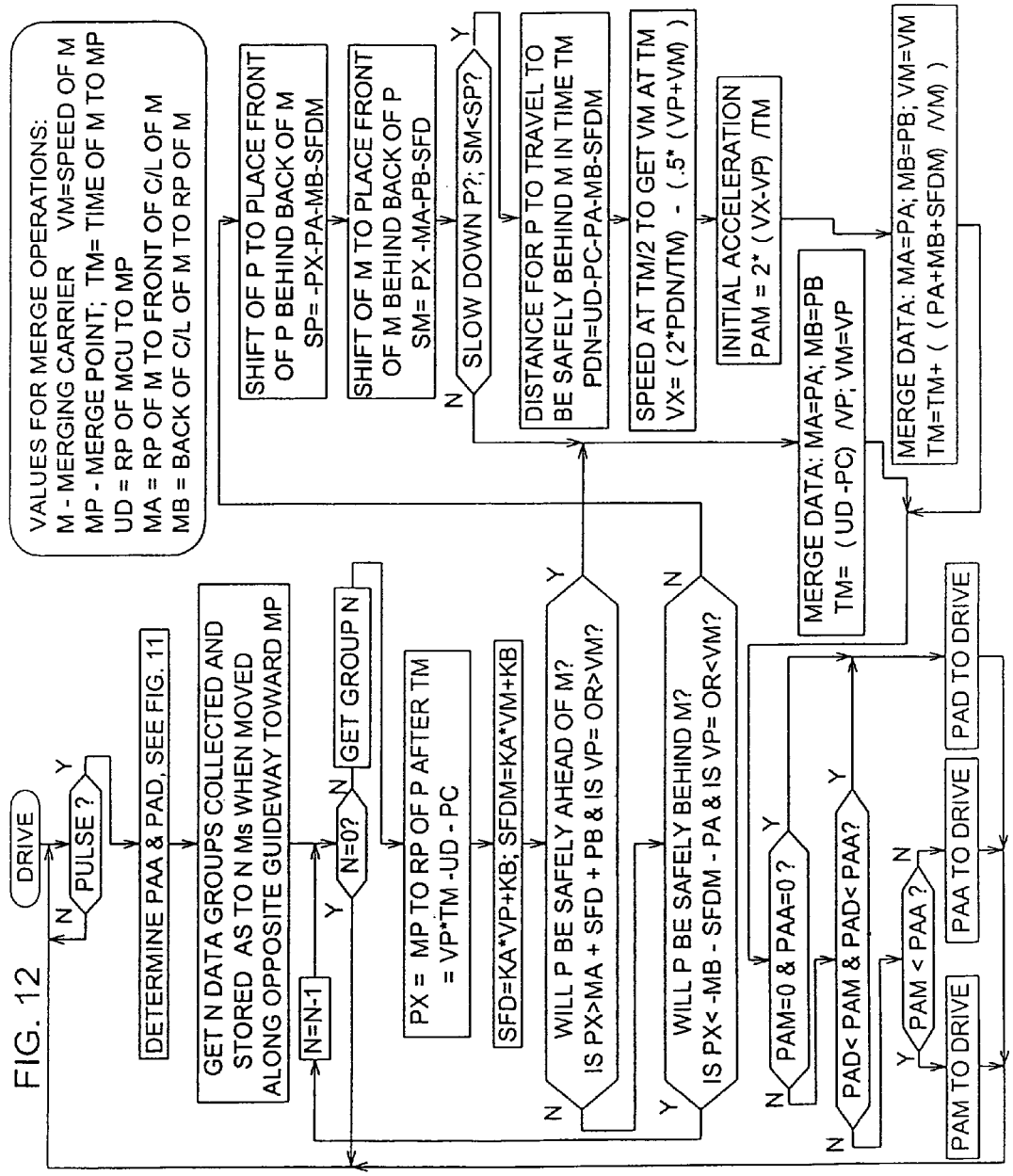
FIG. 12 is a flow diagram showing the operation of a second type of drive processor for the MCU of FIG. 4.

FIG. 12 is a flow diagram illustrating the operation of a MCU which is in a merge zone and which does not control a scheduled acceleration along a guideway in which it is located. Upon detection of a pulse from the start processor 123, the values of PAA and PAD are determined as in FIG. 11. The next step is to input a number N of data groups which may be available as to N carriers that were detected in previous operations of MCUs along an opposite guideway in the merge zone. As explained in connection with FIGS. 3, 4, 7 and 8, an outgoing merge data processor of each MCU along the opposite guideway will have received merge data from a MCU behind and will have sent collected merge data ahead after adding a group of stored data relating to a passing carrier, if any. Any added group is identified by a number equal to N+1, N being the identification number for the last added group. Groups of data collected in this way along the opposite guideway will have been sent from an end MCU of the opposite guideway to an end MCU along the one guideway As explained in connection with FIGS. 9 and 10, an incoming merge data processor of the MCU that is in the one guideway and closest to the merge point will receive and store merge data from the opposite guideway and send it to the MCU behind. Each other MCU in the one guideway will input merge data from a MCU ahead that was previously collected from the opposite guideway and will send such collected merge data to a MCU behind after storing such merge data for access by the drive processor 124. Thus each MCU of the one guideway can input N groups of input data as to N carriers moving along the opposite guideway.

After getting N groups of data, the first step is to check for N=0 which will be the case initially only if there are no carriers moving along the opposite guideway. Initially, N will usually be a number greater than zero and equal to the number of carriers moving along the opposite guideway. When the MCU gets group N it will initially be the group for the most forward carrier. After getting group N a determination is made as to PX which is the distance from a merge point MP to the reference point RP of the passing carrier P when the merging carrier M reaches the merge point MP. When the MCU is not located along an acceleration zone of a guideway, PX is equal to the product of the speed VP of the passing carrier and the time TM in which the merging carrier is expected to reach MP, minus the distance UD from the MCU to the merge point and minus the distance PC that the passing carrier has moved since detection. TM is in the merge data; UD is stored in the local memory 129; and PC is determined from the distance pulse counter 117.

Next, determinations are made as a safe following distance value SFD based upon the speed VP of the passing carrier and a safe following distance value SFDM based upon the expected speed VM of a merging carrier. Then a determination is made as to whether the passing carrier P will be safely ahead of the merging carrier, i.e. whether PX is greater than MA plus SFD plus PB and whether it will be moving at a speed at least equal to the speed VM of the merging carrier.

If the passing carrier is not safely ahead of the merging carrier, a similar determination is made as to whether the passing carrier will be safely behind the merging carrier, using SFDM and whether VP is not greater than VM as criterions. If so, N is reduced by one and the program gets the merge data group for the next preceding merging carrier, repeating the operations just described. However, if the passing carrier is neither safely ahead nor safely behind the merging carrier, there is a possibility for a collision. Either the passing carrier or the merging carrier should be slowed down. In the illustrated operation, the carrier that is slowed down is that requiring less of a slow-down. Two determinations are made. The first is a distance SP which uses SFDM as a criterion and which is the displacement of the passing carrier from the merge point that is necessary to place it safely behind the merging carrier when the merging carrier is expected to reach the merge point. The second is a distance SM which uses SFD as a criterion and which is the displacement of the merging carrier from the merge point that would be necessary to place it safely behind the passing carrier at the time when the merging carrier would otherwise be expected to reach the merge point.

If SM is not less than SP, i.e. if not more negative, the system allows the merging carrier to be slowed down if necessary after similar determinations during processing by a MCU along the opposite guideway. In this case, or if the passing carrier will be safely ahead of the merging carrier, merge data is determined for storage as a merge data group for the passing carrier. This merge data includes MA and MB made equal to PA and PB respectively, TM made equal to the distance (UD−PC) to the merge point divided by VP and VM made equal to VP.

If SM is less than SP, i.e. more negative and requiring a greater displacement of the merging carrier, the passing carrier is slowed down. First a determination is made as shown as to a distance PDN for the passing carrier to travel to be safely behind the merging carrier when the merging carrier reaches the merge point after the expected time TM. The illustrated program determines an initial value of PAM for control of acceleration of the passing carrier. It is desirable that during the time TM, the passing carrier should start from an initial speed VP, travel the distance PDN and end up moving at the speed VM of the passing carrier. To reach this result, it may be assumed that during the first half of the time TM, the speed of the passing carrier will change at an initial rate from VP to an intermediate speed VX, leaving the last half of time TM for a change at a final rate from VX to the speed VM. With this assumption, VX is calculated as a function of PDN, TM, VP and VM in the way shown in FIG. 12. The initial value of PAM is then determined as being equal to 2*(VX−VP)/T. Other methods may be used to determine PAM.

It is noted that the operations depicted in FIG. 12 may be repeated at the rate at which pulses are applied through line 134 to the drive processor 124 (see FIG. 4). As described in connection with FIG. 5, the rate of application of such pulses may be 100 Hz as an example. Thus there is a dynamic control of PAM through which there can be a rapid response to changes in VP or VM or other variables. Computer simulations indicate that the procedures as shown and described should result in gradual decelerations of passing carriers to place them safely behind merging carriers well before the time when the merging carriers reach the merge point. Testing of carriers that are actually operative may suggest refinements or changes that may be desirable.

After determining PAM, merge data is determined by making MA, MB and VM equal to PA, PB and VP respectively. TM is increased by the time required to travel the remaining distance to the merge point after the elapse of TM, equal to PA+MB+SFDM/VM. After either determination of merge data, tests are performed as shown to determine whether PAM, PAA or PAD should be sent to the drive output channel 121. PAD is sent if both PAM and PAA are zero or if PAD is less than both PAM and PAA. Otherwise the lesser of PAM and PAA, i.e. that which effects the greater deceleration, is sent.

Figure 13:
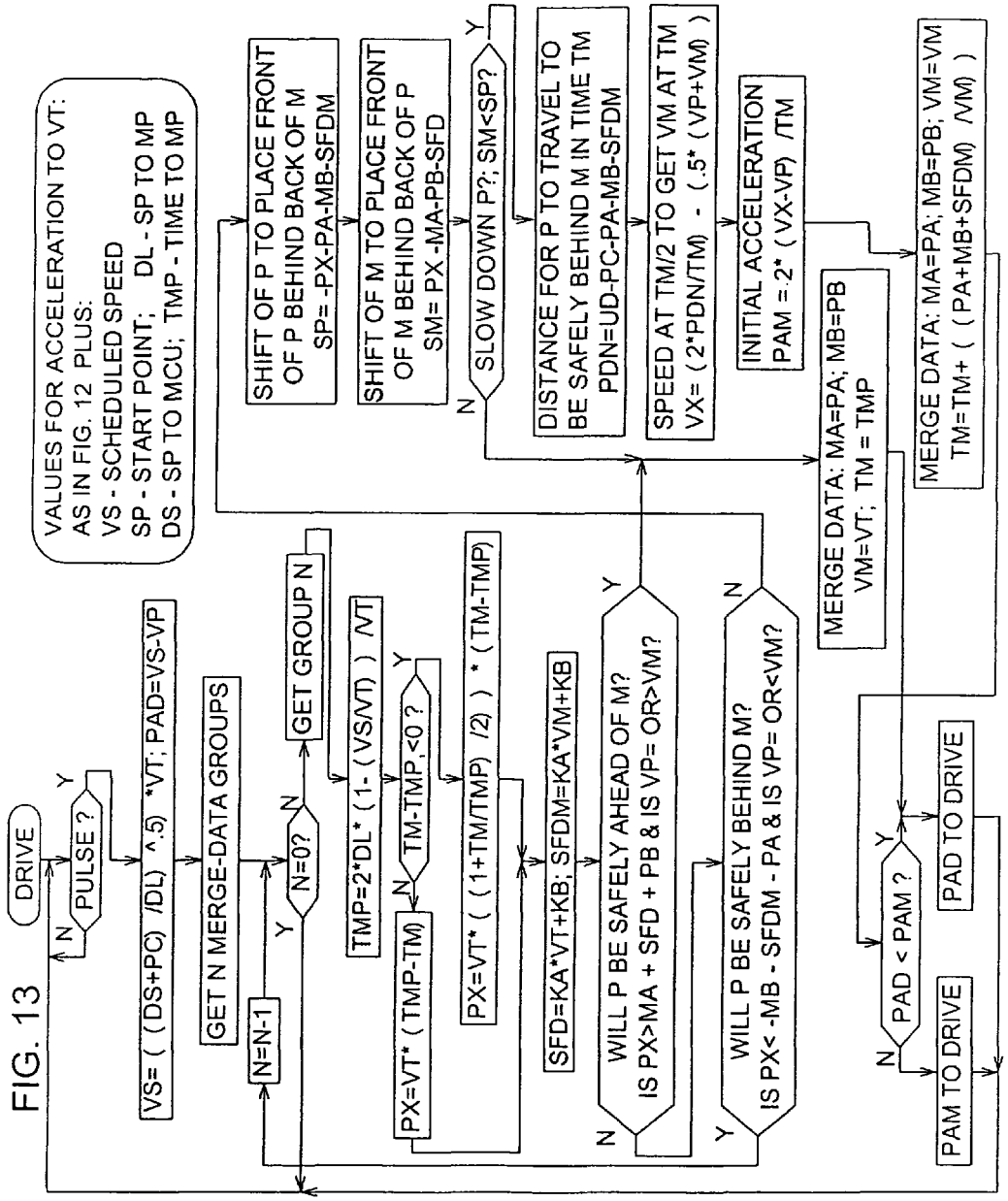
FIG. 13 is a flow diagram showing the operation of a third type of drive processor for the MCU of FIG. 4.

FIG. 13 is a flow diagram illustrating the operation of MCU along a portion of a guideway in which MCUs control a scheduled acceleration from a start point to a merge point at which passing vehicles enter at a target speed VT. The first determination in the flow diagram as illustrated is a scheduled speed VS that increases as a square root function of the distance from the start point and thereby as a linear function of time, i.e. a uniform acceleration is assumed. While a uniform acceleration simplifies illustration and computations, it should be understood that in many circumstances a uniform acceleration may not be the most desirable and appropriate modifications may be made. For example, the drive of the carrier may desirably include an electric motor and a multi-ratio or continuously variable transmission. In that case, it will be desirable to use greater acceleration at lower speeds, to the extent that traction is available, and less acceleration at higher speeds, when wind resistance is greater. The size and power output capabilities of the motor will thereby be used to maximum advantage. The time and distance required to reach the desired speed will be reduced.

After determining VS, a PAD value is set equal to VS−VP. Then the program gets N merge-data groups previously collected and stored in response to movement of carriers along an opposite guideway toward the merge point. After getting group N, a distance PX is determined. PX is the distance from the merge point to the reference point of the passing carrier after TM, the time that the merging carrier is expected to reach the merge point. First, a time TMP is determined as shown. TMP is the time required for the passing carrier to reach the merge point. If TM−TMP is not less than zero, the passing carrier will reach the merge point in at least the time required for the merging carrier to reach the merge point and will be moving at the target speed VT. PX will then be equal to VT*(TM−TMP). If TM−TMP is less than zero, the passing carrier will not reach the merge point in the time TM and will be moving at speed less than VT. PX will then have a negative value which is determined as shown equal to the product of (TM−TMP) and the average speed between TM and the time at which the passing carrier is scheduled to reach the target speed VT.

After PX is determined, SFD and SFDM are determined and additional operations are performed as shown in the same way as described above in connection with FIG. 12. The merge data determination after a PAM determination is the same as in FIG. 12. However the merge data determination is different from that in FIG. 12 after the passing carrier is found to be safely ahead of the merging carrier, or after a decision to allow a slow down of the merging carrier because the merging carrier will require less of a slow down. In either of such cases TM is set equal to TMP, the time required for the passing carrier to reach the merge point.

Subsequent determinations, after one of the other of the merge data determinations is made, are simpler that those shown in FIG. 12 since a value of PAA is not determined. The value of PAD is sent to the drive unless PAM has been determined and is found to be less than PAD, i.e. requiring a greater deceleration. PAA is not determined in the FIG. 13 operation for the reason that a scheduled acceleration of a carrier is assumed to be used in a typical condition such that each carrier leaves a loading or unloading station well behind a carrier ahead so that there is no need for following distance control. Each carrier also moves at a speed much slower than that of the carrier ahead so that there should be no need for speed control. However, a control could be added to cause the speed of each carrier to be no greater than that of a vehicle ahead.

FIGS. 11, 12 and 13 and the foregoing descriptions thereof indicate ways in which processor programs can be designed to be suitable for the particular circumstances that are described. In similar ways, processor programs suitable for other circumstances can be designed.

Modifications and variations may be made without departing from the spirit and scope of the novel concepts of this invention.

I claim:

1. A control system for carriers that are movable in a network of guideways to automatically carry loads from entrance stations to exit stations along said guideways, wherein said network includes convergent Y-junctions in each of which first and second entrance guideways merge into an exit guideway, said control system comprising:

monitoring means for monitoring carriers moving along said guideways to develop speed data that is related to the speeds of said carriers, said monitoring means including processor means operative for periodically determining from said speed data arrival data that includes the expected times of arrival at a merge point of a convergent Y-junction of carriers that are moving along said first and second entrance guideways of said convergent Y-junction and that are within a certain distance behind said merge point, said monitoring means including means for temporarily storing said arrival data when so determined, and said processor means being operative to develop comparison data from comparisons of arrival data currently determined as to carriers moving along one of said entrance guideways with arrival data previously obtained and stored as to carriers moving along the other of said entrance guideways, and said processor means being operative to develop from said comparison data deceleration data usable to so decelerate each carrier moving along said one of said entrance guideways as may be required to avoid eventual collision with any carrier moving on the other of said entrance guideways, and control means for applying said deceleration data to decelerate the corresponding carrier moving along said one of said entrance guideways.

2. A control system as defined in claim 1, wherein said comparison data is developed from comparisons of arrival data currently determined as to each carrier movable along each of said entrance guideways with arrival data previously obtained and stored as to carriers moving along the other of said entrance guideways, wherein said processor means is operative to develop from said comparison data deceleration data usable to so decelerate each carrier moving along each of said entrance guideways as may be required to avoid eventual collision with any carrier moving on the other of said entrance guideways, and wherein said control means apply said deceleration data to decelerate only the carrier moving on one of said entrance guideways which requires the least deceleration to avoid a collision with a carrier moving on the other of said guideways.

3. A control system as defined in claim 1, wherein MCUs (monitoring and control units) are assigned to contiguous regions along said guideways, wherein a plurality of said MCUs are along said first and second entrance guideways of said convergent Y-junction and within said certain distance from said merge point of said convergent Y-junction, and wherein said processor means include processors of said plurality of MCUs.

4. A control system as defined in claim 1, wherein said processor means includes MCUs (monitoring and control units) assigned to contiguous regions along said guideways, each MCU being active for monitor and control of a passing carrier during movement of the passing carrier through its assigned region and being operative to develop position data defining the distance of travel of said monitored passing carrier since entering said assigned region, wherein said MCUs are arranged for sending data rearwardly from each active processor means to the next active processor means behind, each MCU being operative to respond to data sent rearwardly from an active MCU ahead and to supply corresponding control data to a passing carrier to maintain a safe following distance behind a carrier ahead.

5. A control system as defined in claim 4, wherein data that are received by a next active MCU behind in response to data sent rearwardly from an active MCU ahead includes speed data as to the speed of the carrier ahead and distance data that corresponds to the sum of said position data and data as to the assigned lengths of any intervening MCUs with inactive processor means.

6. A control system as defined in claim 5, wherein each active MCU adds to distance data received from a MCU ahead the effective length of its assigned region less said position data as to a passing carrier to determine the distance to a next carrier ahead with an active processor.

7. A control system as defined in claim 4, wherein each of said carriers is operative to send pulses to MCUs at a rate proportional to its speed of travel, and wherein said position means includes counter means operative to count said pulses following entry of a passing carrier into said assigned region.

8. A control system as defined in claim 7, wherein each MCU is arranged when active for monitoring and control purposes to send said position data to the next MCU behind and wherein each MCU is arranged when inactive for monitoring and control purposes to send data received from a next MCU ahead to a next MCU behind after adding data as to the length of its assigned region.

9. A control system as defined in claim 1 wherein said processor means includes MCUs (monitoring and control units) assigned to contiguous regions along said guideways, each MCU being active for monitor and control of a passing carrier during movement of the passing carrier through its assigned region and being operative to develop position data defining the distance of travel of said monitored passing carrier since entering said assigned region, wherein said system of guideways includes divergent Y-junctions each allowing a carrier entering from an entrance guideway to exit on either of two exit guideways, wherein a MCU along each divergent Y-junction entrance guideway stores direction data, obtains destination data from each passing carrier and compares said stored direction data and said destination data to send steer data to the passing carrier to cause exit of the carrier along the proper one of the two exit guideways of the divergent Y-junction.

10. A control system as defined in claim 9 wherein first and second groups of MCUs are assigned to contiguous regions along said first and second exit guideways of each divergent Y-junction and third and fourth groups of MCUs precede said first and second groups and are assigned to parallel contiguous regions along said entrance guideway, each MCU being operative during passing of a carrier through its assigned region to develop data to be sent rearwardly to MCUs behind as carrier ahead data, and a connection between each MCU of each group and the preceding MCU of the same group to enable each MCU to obtain said carrier ahead data.

11. A control system as defined in claim 10, further comprising cross-connections between MCUs of said first and second groups to enable each MCU of either of said first and second groups to obtain said carrier ahead data from the other of said first and second groups.

12. A control system as defined in claim 9, wherein fifth and sixth groups of said MCUs are along said first and second entrance guideways of a convergent Y-junction and wherein seventh and eighth groups of said MCUs are in parallel relation along the exit guideway of the convergent Y-junction and are connected to said fifth and sixth groups of MCUs entrance guideways to enable each MCU of either of said fifth and sixth groups of MCUs along said first and second guideways to obtain carrier ahead data as any carrier moving on said exit guideway.

13. A control system as defined in claim 12, further comprising cross-connections between MCUs of said fifth and sixth groups to enable MCUs of either of said fifth and sixth groups to obtain said carrier ahead data from the other of said fifth and sixth groups.

14. A control system for use in a system of guideways that includes convergent Y-junctions in each of which first and second entrance guideways merge into an exit guideway, said control system comprising:

MCUs (monitoring and control units) for monitoring and control of carriers moving along said guideways, means for supplying to MCUs of one said first and second entrance guideways of a convergent Y-junction data that includes arrival data as to carriers that are moving along the other of said first and second entrance guideways of said convergent Y-junction and that are within a certain approach distance to a merge point of said convergent Y-junction, said arrival data defining the expected times to arrival of carriers at said merge point and speeds at arrival of carriers at said merge point, and said MCUs of said one of said first and second entrance guideways including comparison means for comparison of said arrival data with data obtained from a passing carrier, and acceleration control means controlled by said comparison means for so controlling acceleration of passing carriers moving along said one of said first and second entrance guideways as to avoid collisions between carriers moving into said merge region from said other of said first and second entrance guideways.

15. A control system for use in a system of guideways that includes, convergent Y-junctions in each of which first and second entrance guideways merge into an exit guideway, said control system comprising:

MCUs (monitoring and control units) for monitoring and control of carriers moving along said guideways, means for supplying to MCUs of each of said first and second entrance guideways of a convergent Y-junction data that includes arrival data as to carriers that are moving along the other of said first and second entrance guideways of said convergent Y-junction and that are within a certain approach distance to a merge point of said convergent Y-junction, said arrival data defining the expected times to arrival of carriers at said merge point and speeds at arrival of carriers at said merge point, and said MCUs of each of said first and second entrance guideways including comparison means for comparison data obtained from a passing carrier with said arrival data, and acceleration control means controlled by said comparison means of said MCUs along said first and second entrance guideways for so controlling acceleration of passing carriers as to avoid collisions between carriers moving into said convergent Y-junction.

16. A control system as defined in claim 15, said comparison means including means for developing deceleration data as any deceleration that is required as to carriers moving on either of said first and second entrance guideways to avoid collision with carriers moving on the other of said first and second entrance guideways, and acceleration control means responsive to said deceleration data to effect deceleration of those carriers moving on either of said first and second guideways which require the least deceleration necessary to avoid collision with carriers moving on the other of said first and second guideways.

17. A control system as defined in claim 15, wherein in each convergent Y-junction a first group of said MCUs are assigned to contiguous regions along said first entrance guideway and a second group of said MCUs are assigned to contiguous regions along said second entrance guideway, wherein each MCU of each group is operative during passing of a carrier through its assigned region to obtain and store arrival data as to the expected time of arrival of the passing carrier at said merge point, and wherein said comparison means compare arrival data currently obtained from a passing carrier with arrival data previously obtained and stored by MCUs of the other of said first and second groups.

18. A control system as defined in claim 17, wherein interconnections of MCUs of each group are provided between a start MCU at a distance behind said merge point and an end MCU at said merge point for periodic collection of stored arrival data, and wherein interconnections are provided between end MCUs of said groups and between the end and start MCUs of each group for transfer of arrival data collected from MCUs of each group to all MCUs between the end and start MCUs of the other group, whereby data is available to each MCU of each of said first and second groups that includes arrival data previously obtained and stored by MCUs of the other of said first and second groups.

\* \* \* \* \*